United States Patent [19]
Liu et al.

[11] Patent Number: 5,859,924
[45] Date of Patent: *Jan. 12, 1999

[54] METHOD AND SYSTEM FOR MEASURING OBJECT FEATURES

[75] Inventors: Kuo-Ching Liu, Setauket; Chu-Kwo Liang, Whitestone; Jong-Kae Fwu, Bayside; Chung-Po Huang, Hauppauge, all of N.Y.

[73] Assignee: Robotic Vision Systems, Inc., Hauppage, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 680,342

[22] Filed: Jul. 12, 1996

[51] Int. Cl.$^6$ ................................................. G01B 11/03
[52] U.S. Cl. ..................... 382/145; 382/154; 382/172; 356/375; 250/559.23; 250/559.34
[58] Field of Search ..................... 382/154, 172; 348/87, 92, 131, 126, 94, 139; 356/375, 384, 3.01, 3.03, 4.03, 359, 394, 237, 3.08, 3.06; 364/560, 562, 563; 250/559.23, 559.24, 559.31, 559.34, 559.38; 355/52, 53; 437/8

[56] References Cited

U.S. PATENT DOCUMENTS

| | | | |
|---|---|---|---|
| 891,013 | 6/1908 | Smith | 156/58 |
| 1,596,458 | 8/1926 | Schiesari | 396/431 |
| 2,177,737 | 10/1939 | Mohr et al. | 396/342 |
| 3,479,945 | 11/1969 | Koch | 396/145 |
| 4,146,327 | 3/1979 | Harris | 356/1 |
| 4,152,723 | 5/1979 | McMahon et al. | 348/126 |
| 4,238,147 | 12/1980 | Stern | 354/77 |
| 4,286,293 | 8/1981 | Jablonowski | 358/199 |
| 4,343,553 | 8/1982 | Nakagawa et al. | 356/376 |
| 4,441,124 | 4/1984 | Heebner et al. | 348/126 |
| 4,443,705 | 4/1984 | DiMatteo et al. | 250/558 |
| 4,494,874 | 1/1985 | DiMatteo et al. | 356/376 |
| 4,527,893 | 7/1985 | Taylor | 356/4 |
| 4,529,316 | 7/1985 | DiMatteo | 356/376 |
| 4,590,367 | 5/1986 | Ross et al. | 250/205 |
| 4,594,001 | 6/1986 | DiMatteo et al. | 356/376 |
| 4,645,348 | 2/1987 | Dewar et al. | 356/376 |
| 4,682,894 | 7/1987 | Schmidt et al. | 356/375 |
| 4,688,939 | 8/1987 | Ray | 356/237 |
| 4,740,708 | 4/1988 | Batchelder | 250/563 |
| 4,762,990 | 8/1988 | Caswell et al. | 250/221 |
| 4,796,997 | 1/1989 | Svetkoff et al. | 356/376 |
| 4,824,251 | 4/1989 | Slotwinski et al. | 356/349 |

(List continued on next page.)

FOREIGN PATENT DOCUMENTS 62-79644  4/1987  Japan .
63-5243   1/1988  Japan .

OTHER PUBLICATIONS

View 830 Brochure, 5 pgs., View Engineering, Inc., 1993.
View 830 Brochure, 4 pgs., View Engineering, Inc., Feb. 1995.
View 880 Brochure, 6 pgs., View Engineering, Semiconductor Products Group, Simi Valley, CA.
View 880 Brochure, 2 pgs., View Engineering, Semiconductor Products Group, Simi Valley, CA., Dec. 1994.
View PR–2000, 2 pgs., View Engineering, Inc., 1995.
WF–730DUO™ In–Line Inspection Systems, 2 pgs., Semiconductor International, Jan. 1997, advertisement.

Primary Examiner—Joseph Mancuso
Assistant Examiner—Brian P. Werner
Attorney, Agent, or Firm—Kenyon & Kenyon

[57] ABSTRACT

A system is provided that simultaneously gathers three-dimensional and two-dimensional data for use in inspecting objects such as chip carriers for defects. Specifically, a source laser beam is directed to an object and forms a spot at the point of impingement at a known X-Y position on the object. The laser beam is reflected at the spot and light reflected off-axially with respect to the source laser beam is detected by two position sensing detectors (PSDs). Simultaneous to detecting off-axially reflected light, retro-reflected light (i.e., the light reflected approximately co-axial with the source laser) is detected by a photo diode array.

22 Claims, 12 Drawing Sheets

U.S. PATENT DOCUMENTS

| | | | |
|---|---|---|---|
| 4,925,308 | 5/1990 | Stern et al. | 356/375 |
| 4,957,369 | 9/1990 | Antonsson | 356/376 |
| 4,976,356 | 12/1990 | Mizuno et al. | 209/359 |
| 4,982,103 | 1/1991 | Meiffren et al. | 250/560 |
| 4,991,968 | 2/1991 | Yonescu et al. | 356/376 |
| 5,024,529 | 6/1991 | Svetkoff et al. | 356/376 |
| 5,030,008 | 7/1991 | Scott et al. | 356/394 |
| 5,060,065 | 10/1991 | Wasserman | 358/106 |
| 5,075,872 | 12/1991 | Kumagai | 382/172 |
| 5,091,692 | 2/1992 | Ohno et al. | 324/158 |
| 5,172,005 | 12/1992 | Cochran et al. | 250/57 |
| 5,179,413 | 1/1993 | Griffith | 355/229 |
| 5,208,463 | 5/1993 | Honma et al. | 250/561 |
| 5,230,027 | 7/1993 | Kikuchi | 382/8 |
| 5,245,421 | 9/1993 | Robertson et al. | 358/101 |
| 5,247,585 | 9/1993 | Watanabe | 382/19 |
| 5,260,779 | 11/1993 | Wasserman | 358/93 |
| 5,305,091 | 4/1994 | Gelbart et al. | 356/375 |
| 5,311,598 | 5/1994 | Bose et al. | 382/8 |
| 5,347,363 | 9/1994 | Yamanaka | 356/376 |
| 5,351,126 | 9/1994 | Takada et al. | 356/376 |
| 5,365,084 | 11/1994 | Cochran et al. | 250/571 |
| 5,365,341 | 11/1994 | Sugawara | 356/394 |
| 5,367,439 | 11/1994 | Mayer et al. | 362/32 |
| 5,371,375 | 12/1994 | Stern et al. | 250/561 |
| 5,384,000 | 1/1995 | Nishiguchi | 156/297 |
| 5,399,870 | 3/1995 | Torii et al. | 250/561 |
| 5,406,372 | 4/1995 | Vodanovic et al. | 356/394 |
| 5,448,650 | 9/1995 | Desai et al. | 382/141 |
| 5,455,870 | 10/1995 | Sepai et al. | 382/147 |
| 5,461,417 | 10/1995 | White et al. | 348/131 |
| 5,463,213 | 10/1995 | Honda | 235/468 |
| 5,463,227 | 10/1995 | Stern et al. | 250/559.29 |
| 5,465,152 | 11/1995 | Bilodeau et al. | 356/371 |
| 5,490,084 | 2/1996 | Okubo et al. | 364/489 |
| 5,506,793 | 4/1996 | Straayer et al. | 364/571.01 |
| 5,509,104 | 4/1996 | Lee et al. | 395/2.65 |
| 5,510,625 | 4/1996 | Pryor et al. | 250/559.23 |
| 5,528,371 | 6/1996 | Sato et al. | 356/372 |
| 5,546,189 | 8/1996 | Svetkoff et al. | 356/376 |
| 5,550,583 | 8/1996 | Amir et al. | 348/126 | ns
METHOD AND SYSTEM FOR MEASURING OBJECT FEATURES

FIELD OF INVENTION

The present invention is directed to a method and system for measuring selected features of objects. In particular, the present invention is directed to simultaneously collecting three-dimensional and two-dimensional data concerning features of an object, and using such data to determine the dimensions and relative positions of the features.

COPYRIGHT NOTICE

A portion of the disclosure of this patent document contains material which is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

BACKGROUND OF THE INVENTION

The complexity of semiconductor chips has increased dramatically over the past several years. Such increased complexity has lead to an increase in the number of input and output leads or contacts required for each chip. Furthermore, the demand for a small "footprint," i.e., the amount of space required by a component on a printed circuit board, has lead to smaller and smaller package sizes.

In response to these demands, new semiconductor packages (also known as "chip carriers") have been developed that are small in size, yet have a large number of input and output leads or contacts. These packages include, for example, ball grid arrays (BGAs) which are slightly larger than the semiconductor die they package and having contacts (i.e., balls or bumps of solder) that are around 30 mils in diameter. Also, chip size packages (CSPs) which are about the size of the semiconductor die they package and having contacts that are around 10–15 mils in diameter. Additionally, "flip chips" have been developed wherein contacts are adhered directly to the semiconductor wafer, the contacts being approximately 5–10 mils in diameter.

The reduction in the diameter of contacts, and also the general shape of the new contacts, i.e., ball or bump, has made it increasingly difficult to accurately control the quality of the contacts on the semiconductor. In particular, there is a need to accurately measure the dimensions and location of the ball or bump contacts in order to compare the manufactured semiconductor chip (packaged or otherwise) to a manufacturer's specification.

One typical way of measuring the dimensions of contacts or leads on chip carriers is through the use of a three dimensional (3-D) vision system that employs optical triangulation techniques. U.S. Pat. No. 5,465,252 issued to Bilodeau et al. (the "'152 patent"), expressly incorporated herein by reference, describes one such system. A light source such as a laser is positioned to illuminate an object (such as a packaged semiconductor chip) at a specific X-Y position. The source laser beam is directed through an optical system and forms a focused spot at the point of impingement on the object. The focused spot is reflected and light reflected off-axially with respect to the source laser beam is focussed on a light sensor. The image location (i.e., the point where the reflected spot impinges the light sensor) is related, using standard optics principals, to the location of the light spot on the object, which, in turn, can be used to determine image height (Z location). Calibrated processing electronics are used to calculate the height of the object and store the object height with its associated X-Y location. The light source is then positioned to different X-Y locations, and the process is repeated until 3-D data is gathered for the entire object (or a portion thereof). The stored data is then compared to a manufacturer's specification for the object (or portion thereof) to determine whether the object is defective.

Known 3-D vision systems, such as the system described above, provide accurate results for measuring the dimensions of leads on chip carriers, and for coplanarity inspection of BGAs. However, there is difficulty in obtaining accurate dimensions (such as diameters) of ball, bump, and hemispherically shaped contacts, such as those found on certain chip carriers (e.g., BGAs). This difficulty is largely due to "shadow" effects. Known 3-D vision systems cannot accurately capture data concerning all portions of each ball. These systems rely on complex curve-fitting algorithms to approximate the width of each ball. Accordingly, there is a need for a simplified process for accurately determine dimensional data regarding ball, bump, and hemispherically shaped contacts.

U.S. Pat. No. 4,688,939 issued to Ray (the "'939 patent") describes a system for automatically inspecting bumps of solder on a major surface of a chip carrier. In accordance with the specification of the '939 patent, a chip carrier is placed on a platform beneath a ring light which is in registration with a television camera. Light from the ring light, which is directed at an angle towards all sides of the chip carrier, is only reflected upwardly into the television camera by solder bumps. The output signal of the television camera, which varies with the intensity of the light reflected from the solder bumps, is processed by a vision system to obtain a one-dimensional plot of the light intensity. The intensity plot is then analyzed for missing, bridged, or excessive solder bumps. This system, however, collects only one-dimensional data concerning the chip carrier. If 2- or 3-D data is desired, a separate vision system must be used.

Furthermore, the system described in the '939 patent requires that the area surrounding the solder bumps be very diffuse, serving to scatter rather then reflect light. Accordingly, measurements of solder bumps on chip carriers made of more reflective material will likely prove inaccurate.

SUMMARY OF THE INVENTION

The present invention is directed to a system for quickly and accurately measuring features of objects. In an exemplary embodiment, a system is provided that simultaneously collects three-dimensional and two-dimensional data for use in inspecting objects such as chip carriers for defects. Specifically, a source laser beam is directed to an object and forms a spot at the point of impingement at a known X-Y position on the object. The laser beam is reflected at the spot and the light reflected off-axially with respect to the source laser beam is detected by two position sensing detectors (PSDs).

Simultaneous to detecting off-axially reflected light, retro-reflected light (i.e., the light reflected approximately co-axial with the source laser) is detected by a photo diode array. In this manner, visibility is obtained to the entire upper hemisphere of features such as solder balls and bumps.

Analog signals generated by the PSDs related to the position(s) where the reflected light impinged the PSDs, are used to calculate the Z coordinate of the object (i.e., the height) at the point of impingement of the source laser beam on the object. This value is calculated using standard optical triangulation principals. The three-dimensional (3-D) information can then be compared to manufacturer's specifications for the chip carrier to determine if, for example, each solder ball or bump on a chip carrier such as a ball grid array, is the correct height. Additionally, the information can be used for determining coplanarity.

The amplitude of the reflected light that is received by each PSD at the known X-Y positions may be used to form an image of the reflected energy on a point by point basis. However, the resulting images (one per PSD) will suffer from the same shadowing effects as the three dimensional data that is simultaneously gathered.

Analog signals generated by the photo diode array related to the intensity of the detected retro-reflected light are used to accurately determine the X and Y diameters of each ball/bump on the chip carrier and also determine the X-Y coordinates of the center of each ball/bump. The present invention recognizes that laser beams grazing the edge of a feature such as a ball or bump have lower intensity reflections that the beams striking the center of each ball/bump, or the area surrounding each ball/bump. Accordingly, the intensity value for each X-Y position is compared to a threshold value. If the intensity value is less than the threshold value, the X-Y position is identified as an edge point of a ball/bump.

The two-dimensional image formed by the identified edge points is projected onto the X-axis and also onto the Y-axis. The projected images are then used to determine the relative position of each ball, the diameter of each ball (in both the X and Y directions), and also the center of each ball.

Additionally, the analog signals generated by the 2-D photo diode array (for example, a two axial position sensitive device) also provide information related to the position where the reflected light impinged the array. Since the 2-D diode array is located on the imaging plane of the chip carrier under measurement, the positional information can be used to determine the exact X-Y position of the laser during scanning.

BRIEF DESCRIPTION OF THE DRAWINGS

The foregoing and other features of the present invention will be more readily apparent from the following detailed description of exemplary embodiments taken in conjunction with the attached drawings wherein.

DETAILED DESCRIPTION

Prior Art Vision System

Figure 1:
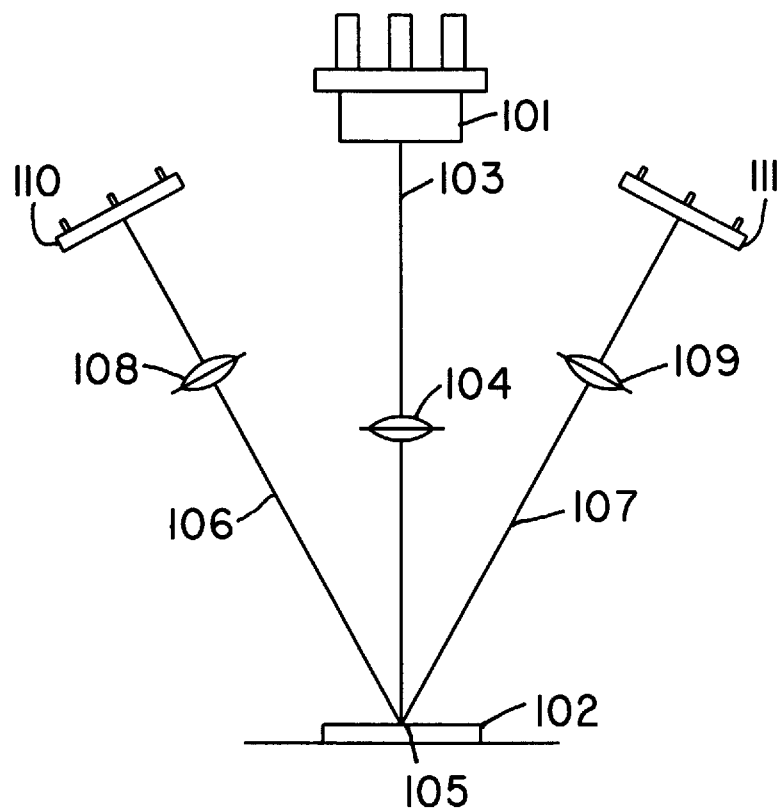
FIG. 1 is a diagram of a prior art vision system.

Referring now to the drawings, and initially FIG. 1, there is illustrated a typical prior art vision system. A source of light, i.e., laser 101, is positioned to illuminate an object such as a chip carrier 102. A laser beam 103 from laser 101 is directed through an optical system 104 and forms a focused spot 105 at the point of impingement on the chip carrier 102 at a known X-Y position. The laser beam 103 focussed at spot 105 is reflected. The light reflected off-axially with respect to the source laser beam (106, 107) is focussed through two optical systems 108 and 109 on to two PSDs 110 and 111. The image height (Z-location) is then calculated based on where the reflected spot impinges the light sensor using standard optical triangulation principals. The laser beam is then directed to different X-Y positions on the chip carrier 102 and the procedure is repeated until 3-D data is gathered for the entire region of interest on the chip carrier 102. A system configured in a manner similar to the system just described has also been used to collect 2-D information. A system of this type, however, cannot directly measure certain features on a chip carrier due to "shadow effects."

Shadow Effects

Figure 2:
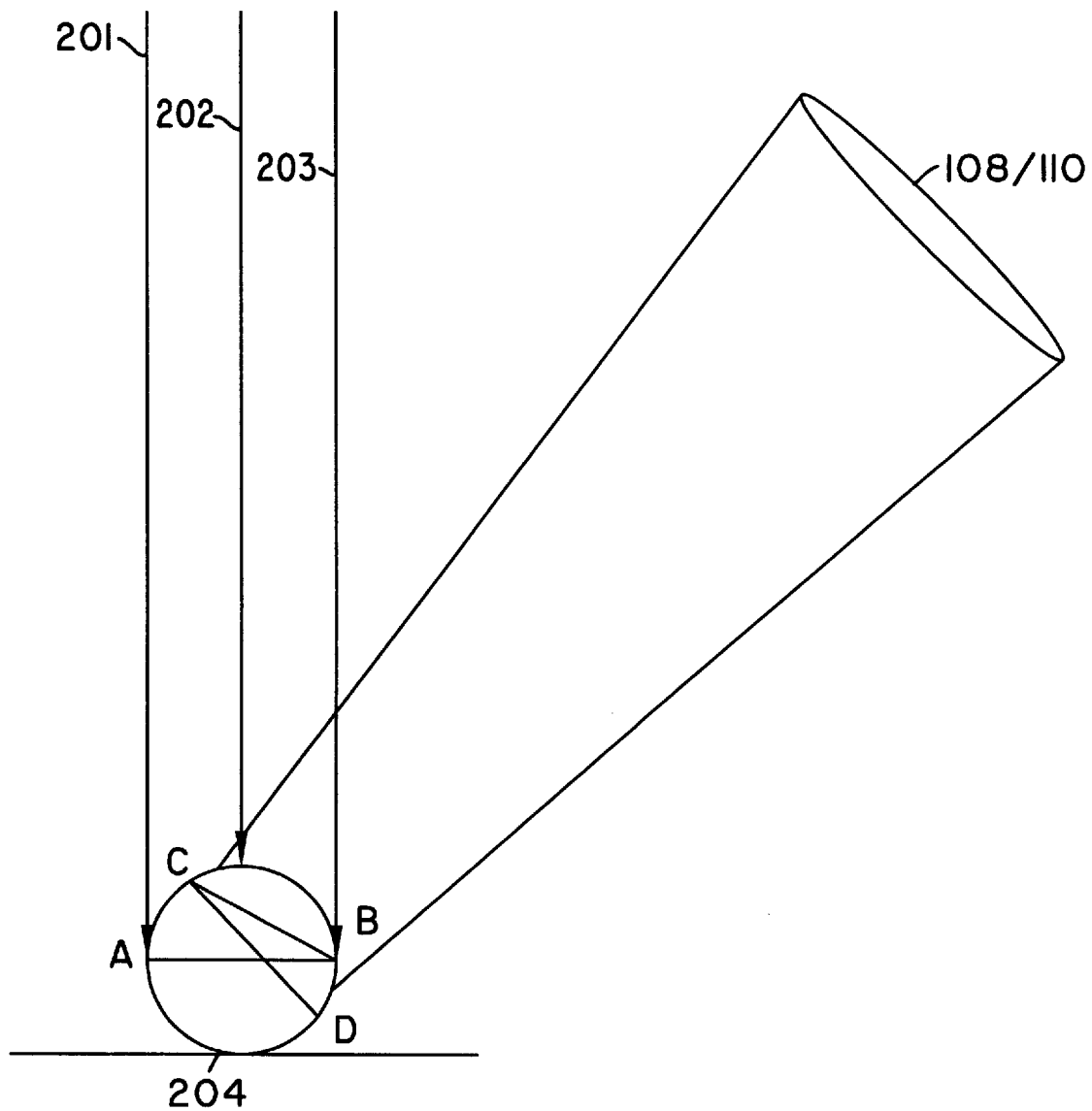
FIG. 2 is an illustration of "shadow" effects.

FIG. 2 illustrates two shadow effects. First, the figure illustrates a shadow area blocked from being illuminated by a beam. As shown, laser beams 201–203 can only scan the upper half of solder ball 204, i.e., the area above line AB. The laser beams 201–203 cannot illuminate the remaining portion of the ball 204 since it is blocked by the top half of the solder ball 204.

A second shadow effect is caused by the limited visibility of the receiver system (i.e., optical system 108 and PSD 110). As illustrated, the area visible to the receiver system, i.e., the area above line CD, is even smaller than a hemisphere. This is due to the finite distance between the receiver optics and the solder ball 204, as well as the finite size of the receiver optics.

As a result of the two above described shadow effects, the measurable area of solder ball 204 is the overlap area of AC and CD, i.e., the area above CB. Accordingly, the diameter of the solder call cannot be directly measured, but it can be determined using complex fitting techniques. However, the accuracy of the results obtained may be less than the required accuracy.

Exemplary Embodiment

Figure 3:
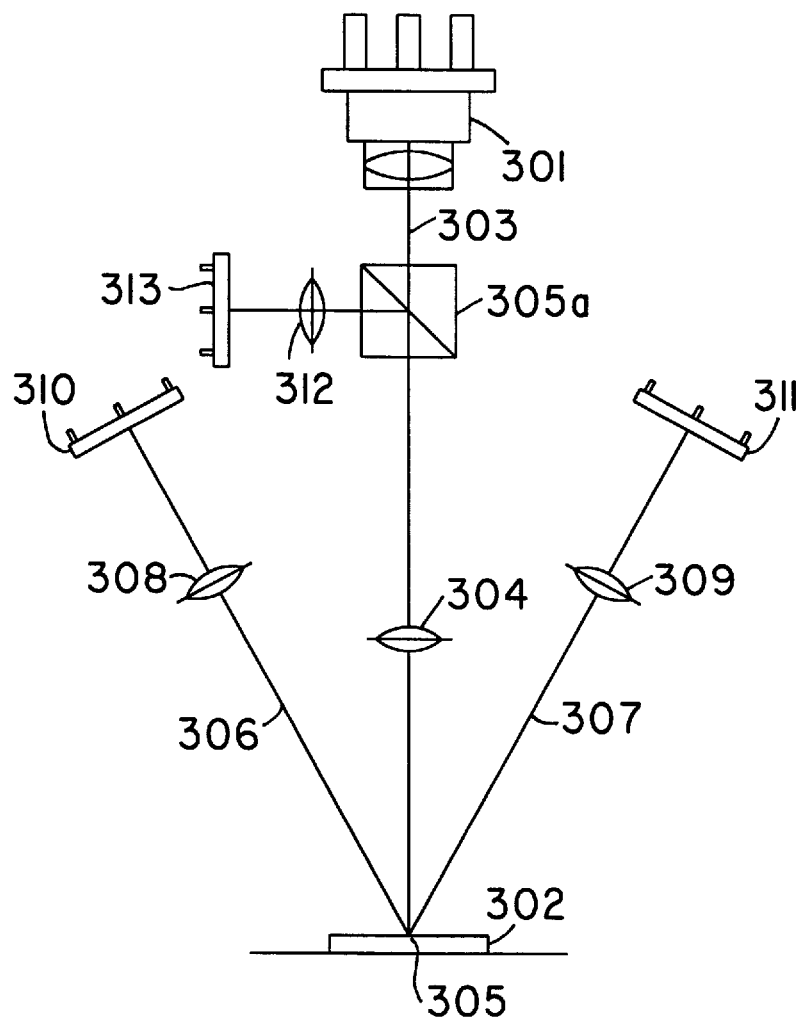
FIG. 3 is a diagram of a first exemplary embodiment of the present invention.

FIG. 3 is a diagram of an exemplary embodiment of the present invention which overcomes many of the problems found in the prior art. A source of light, laser 301 (e.g., a gas laser, or a laser diode and collimator), is positioned to illuminate an object such as a chip carrier 302. A laser beam 303 from laser 301 is directed through a beam splitter 305a and is focussed through an optical system 304 to form a focused spot 305 at the point of impingement on the chip carrier 302 at a known X-Y position. (It will be understood by those of ordinary skill that the light may, instead, be focussed or deflected as a slit, plane of light, or other shape.) The laser beam 303 is reflected by the chip carrier 302 at spot 305. The light reflected off-axially with respect to source laser beam 303 (306, 307) is focussed through two optical systems 308 and 309 on two photo sensitive devices such as, for example, PSDs 310 and 311. (It should be noted that other photo sensitive devices can also be used such as, for example, charge coupled devices (CCDs), or photo diode arrays.) The height (Z-location) at the X-Y position of the object (at the point of impingement of the source laser beam) is then calculated as was described in connection with FIG. 1. Accordingly, 3-D data (i.e., X, Y, and Z coordinates) is obtained, providing a 3-D image of the object at that X-Y location of the object. It will be understood by those of ordinary skill that the 3-D data can be obtained by detecting light reflected (off-axially with respect to the source laser beam) along a single path (and, accordingly, using a single photo sensitive device) rather than along two paths as described above.

2-D Data Capture

In the exemplary embodiment of the present invention, retro-reflected light is also detected and measured (simultaneously to detecting the off-axially reflected light) in order to, for example, provide visibility to the entire upper hemisphere of a feature such as a solder ball or bump (at least a portion of which is not visible to the PSDs 310 and 311). In particular, light reflected at focused spot 305 on the chip carrier 303 back toward the laser 301, i.e., retro-reflected light (light reflected approximately co-axial with the source laser beam 303), is focussed and directed through the optical system 304 to the beam splitter 305. The beam splitter 305 reflects the retro-reflected light through an optical system 312 onto a photo sensitive device, such as, for example photo diode array 313 (other photo sensitive devices, such as a single photo diode can also be used). The value of the light intensity for each X-Y position is stored in a 2-D array (such as Y(i,j)). Accordingly, a 2-D image of the object at the X-Y position is obtained.

The above described procedure (the 3-D and 2-D data collection) is repeated until the entire object (or a relevant portion thereof) is scanned (i.e., many X-Y positions on the object are imaged).

Categorization Of Intensity Values In 2-D Array

Figure 4:
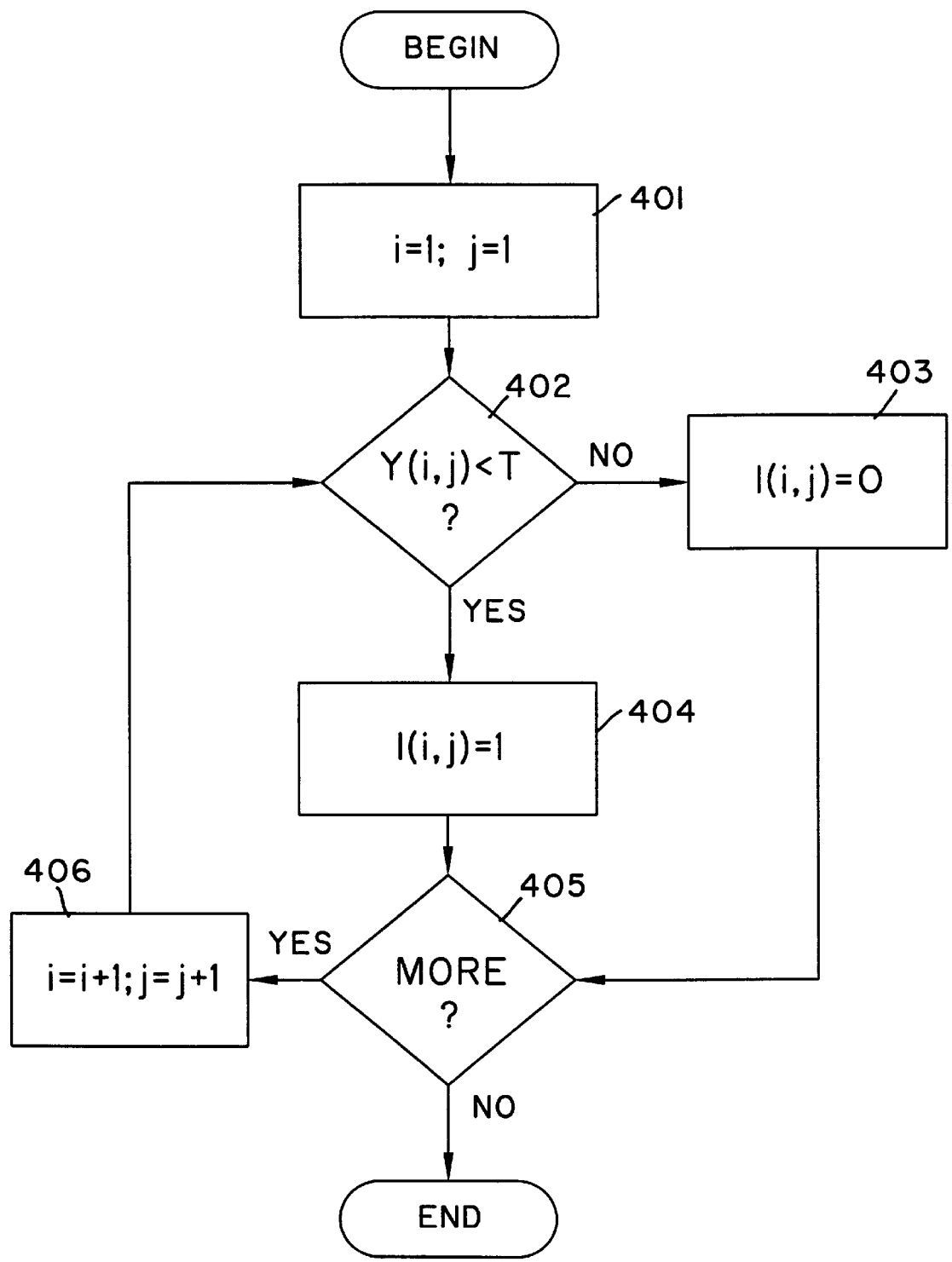
FIG. 4 is a flowchart illustrating the categorization of each collected intensity value in the 2-D array.
Figure 5:
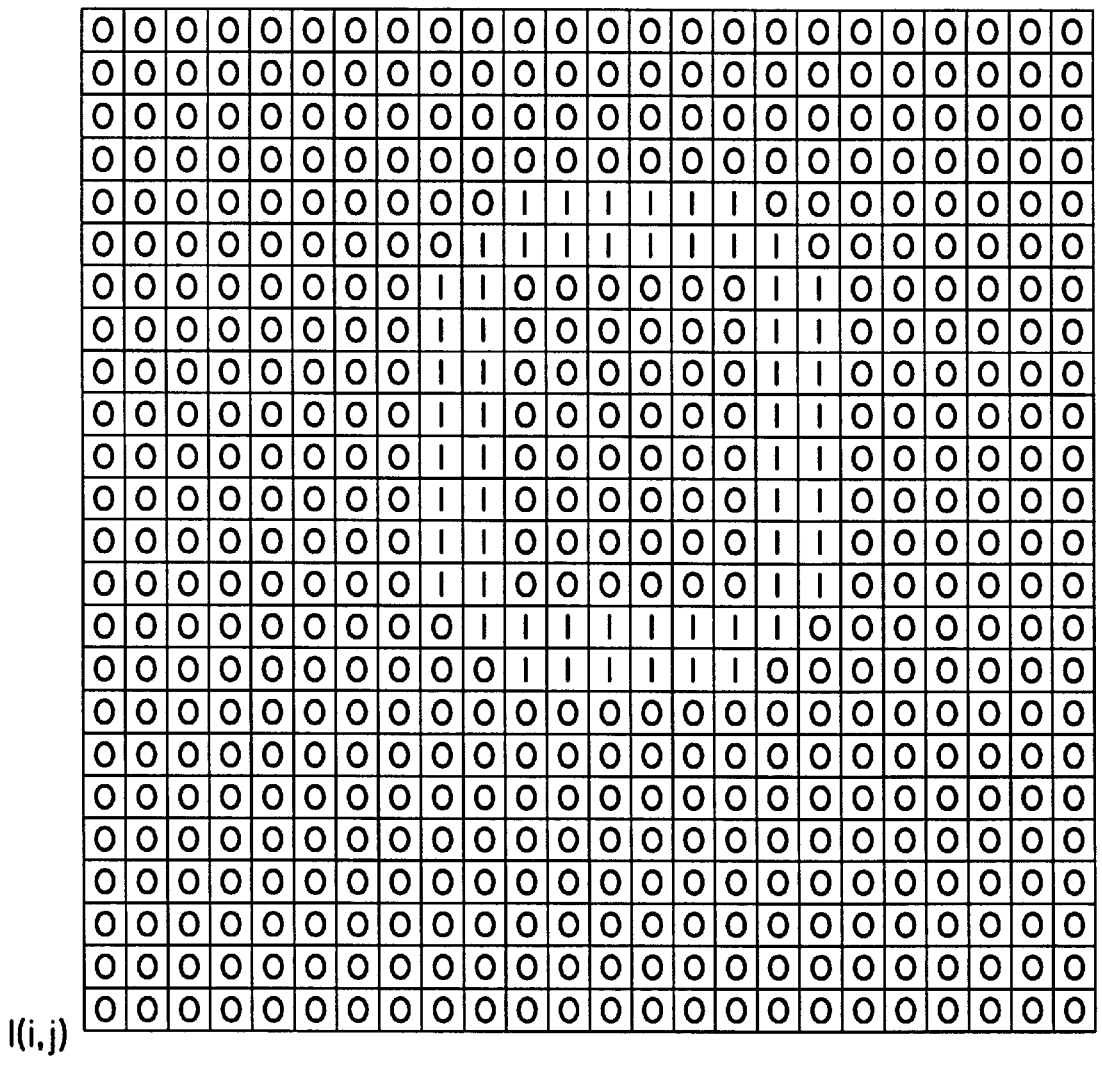
FIG. 5 is the 2-D image of a solder ball as categorized by the process of FIG. 4.

Once the 2-D data is obtained, the information is analyzed. In the representative embodiment of the present invention, it is recognized that laser beams grazing the edge of solder balls or bumps have lower intensity retro-reflections than those striking the center of the solder balls or bumps, and also lower intensity retro-reflections than those beams striking the area surrounding the balls or bumps. Accordingly, X-Y intensity values in the 2-D array are categorized as illustrated in the flowchart of FIG. 4. Indexes i and j are first initialized to refer to the first X-Y intensity value (step 401). Intensity value Y(i,j) is compared to a threshold intensity value T (step 402) (the determination of the threshold value is described below in connection with FIG. 6). If Y(i,j) has an intensity value that is greater than the threshold value T, then Y(i,j) is designated "background" (i.e., it is either the center of the ball/bump or the area surrounding the ball/bump), thus l(i,j) (wherein l(i,j) denotes the label of Y(i,j)) is set to 0 (step 403). If, however, Y(i,j) has an intensity value that is less threshold value T, then Y(i,j) is an edge point of the ball/bump and l(i,j) is set to 1 (step 404). This process is repeated until all of the intensity values in the 2-D array have been compared to the threshold value T (see steps 405, 406). For solder balls and bumps, a typical result is a ring shaped image as shown in FIG. 5.

Determination of a Threshold Intensity Value

Figure 6:
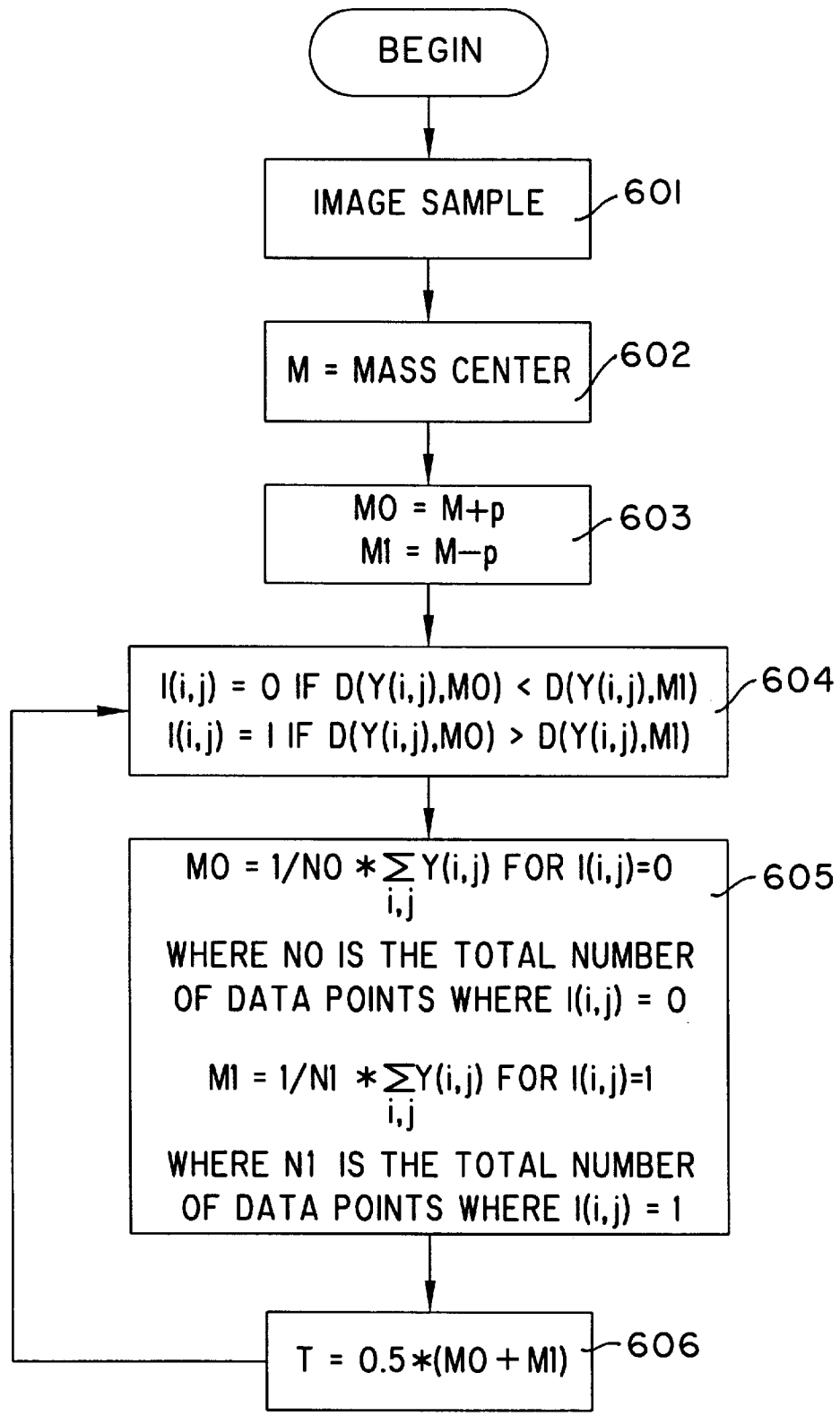
FIG. 6 is a flowchart of the determination of a threshold intensity value.

In the representative embodiment of the present invention, the threshold value is determined using a fast, iterative procedure as shown in the flowchart of FIG. 6. First, a portion of a sample chip carrier, for example, a portion including a solder ball, is imaged using the system described in connection with FIG. 3 (step 601). In the representative embodiment, only the 2-D data collected from the photo diode array 313 is utilized in the threshold value determination. Thus the 3-D data collected from PSDs 310 and 311 need not be stored.

Next, the cluster center M (i.e., the mass center) of the data is determined (step 602). In particular:

$$M = 1/N * \sum_{i,j} Y(i, j),$$

where N is the total number of data samples (i.e., an averaging function). M is then split into two new cluster centers, i.e., M0=M+p and M1=M−p where p is a small predetermined perturbation value (step 603). Typically, p is chosen as p=0.001*M.

Each X-Y intensity value is then classified into one of two classes using the nearest distance rule (step 604). That is:

l(i,j)=0 if D(Y(i,j), M0)<D(Y(i,j), M1);

l(i,j)=1 if D(Y(i,j), M0)>D(Y(i,j), M1);

where D is a distance function (e.g., D(a,b) may be defined as the absolute value of a−b) and l(i,j) denotes the label of the data Y(i,j).

The cluster centers are then updated (step 604) as follows:

$$M0 = 1/N0 * \sum_{i,j} Y(i, j) \text{ for } l(i, j) = 0,$$

where N0 is the total number of data points where l(i,j)=0;

$$M1 = 1/N1 * \sum_{i,j} Y(i, j) \text{ for } l(i, j) = 1$$

where N1 is the total number of data points where l(i,j)=1.

Then, the threshold value is updated (step 605):

T=0.5 * (M0+M1).

Figure 7:
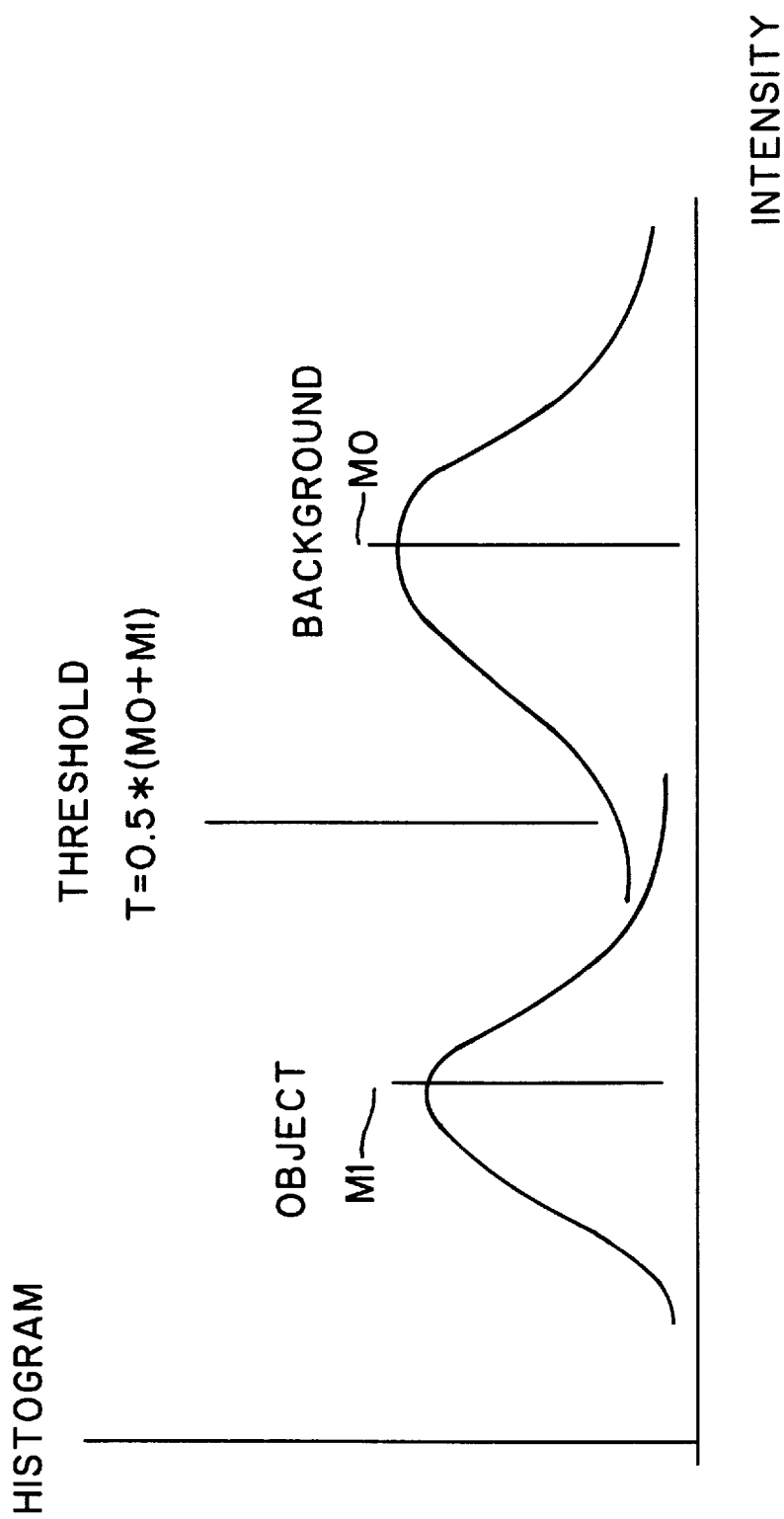
FIG. 7 is a histogram of a 2-D image of a exemplary solder ball on a BGA.

This process continues until convergence is reached. FIG. 7 shows a histogram of a 2-D image of a exemplary solder ball on a BGA.

Analysis of 2-D Data

Once each of the X-Y intensity values are categorized as described in connection with FIG. 4, the 2-D image (i.e., the image formed by the edge points) is analyzed in accordance with the flowchart of FIG. 8. The image is first projected onto the X-axis (step 801). X positional information and the X diameter of each ball is then determined based on the projection, i.e., X diameter=X2−X1 (where X1 and X2 are the minimum and maximum X coordinates of the projected image) (step 802). Additionally, the X center position is calculated (step 803), i.e., X center=X1+(X2−X1)/2.

Next, the 2-D image is projected onto the Y-axis (step 804). Y positional information and the Y diameter of each ball is determined based on this projection, i.e., Y diameter= Y2−Y1 (where Y1 and Y2 are the minimum and maximum Y coordinates of the projected image)(step 805). The Y center position is then calculated (step 806), i.e., Y center= Y1+(Y2−Y1)/2.

The combination of the two center coordinates, i.e., X center and Y center, defines the ball center coordinates (step 807), i.e., ball center=(X center, Y center).

Figure 8:
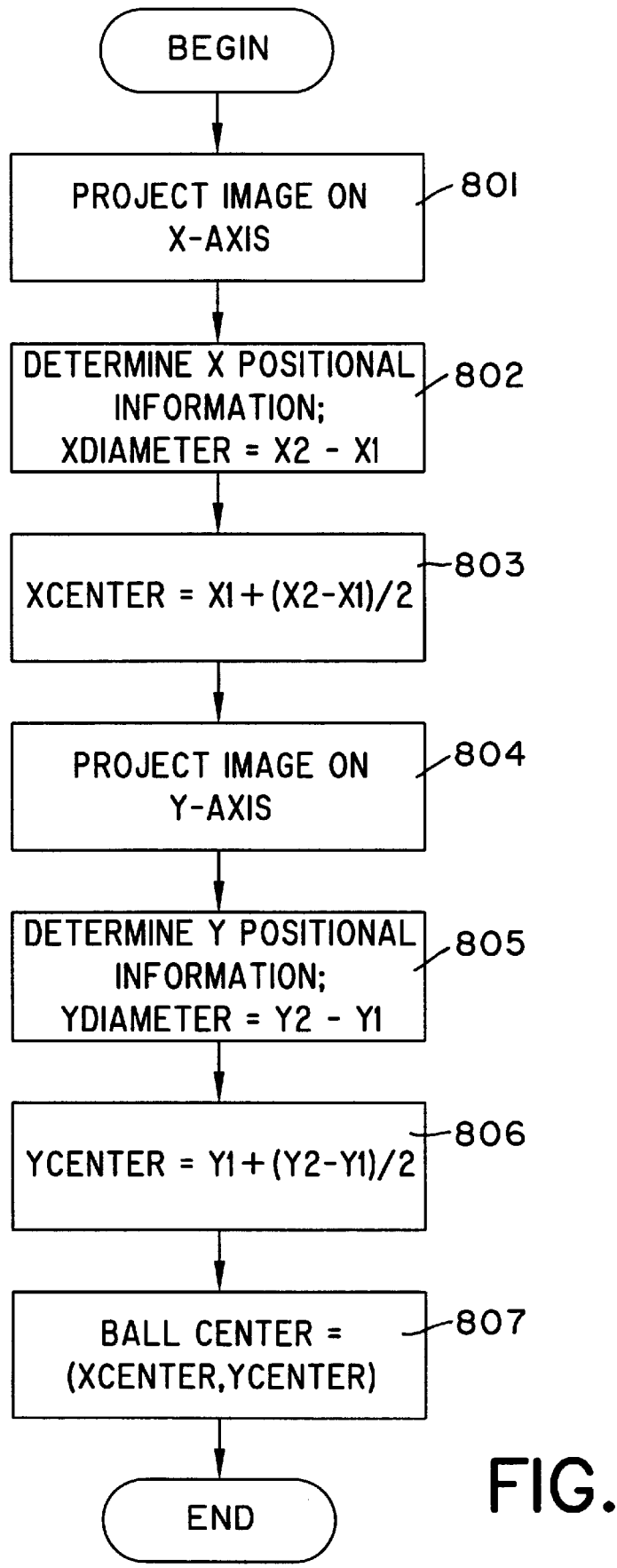
FIG. 8 is a flowchart of the analysis of the 2-D categorized data.

It will be understood by those of ordinary skill that the order of the steps illustrated in the flowchart of FIG. 8 is merely exemplary. Many of the steps could be done in a different order.

Figure 9:
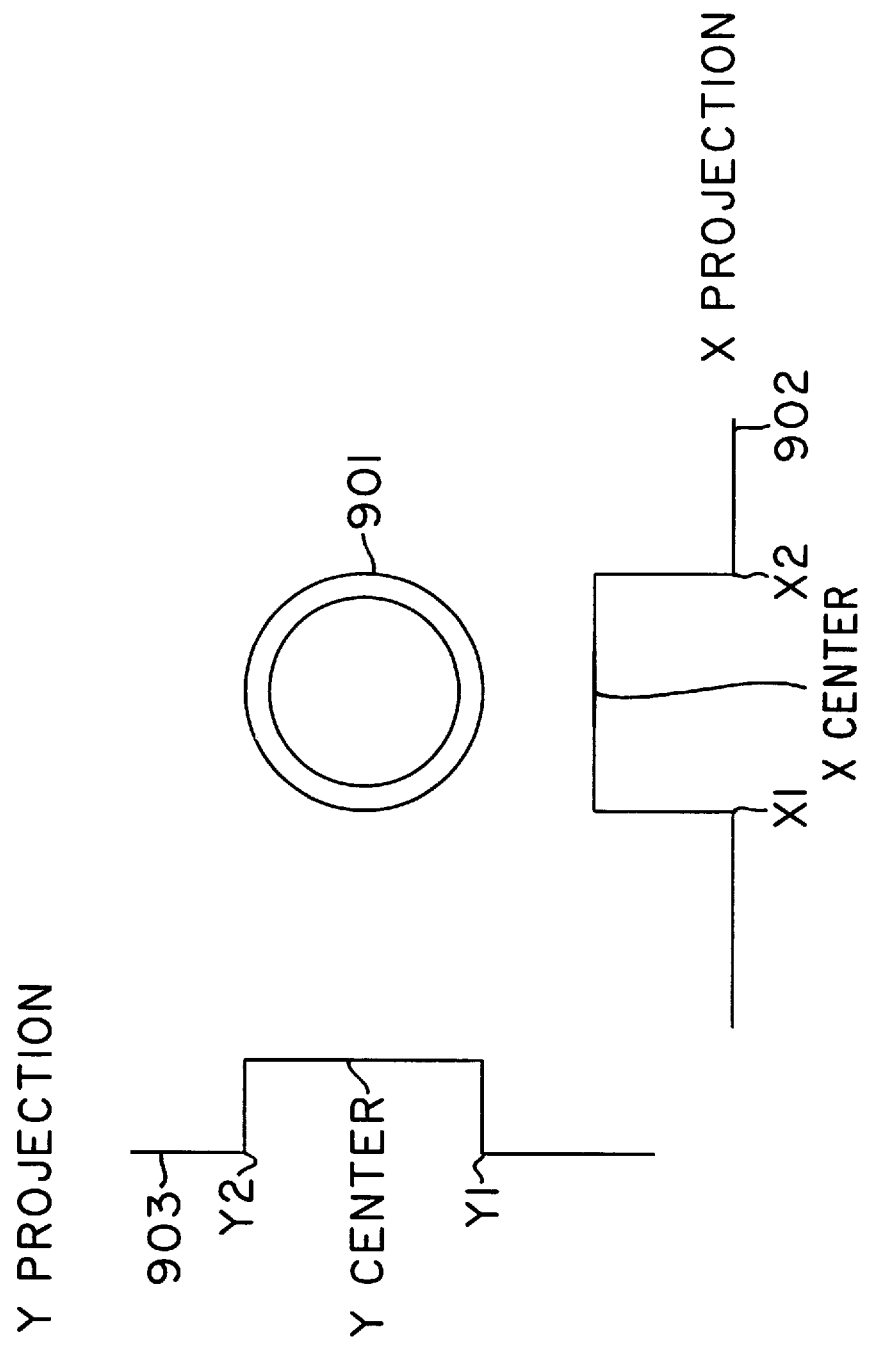
FIG. 9 illustrates the projection of a 2-D image onto the X and Y axes.

FIG. 9 illustrates the projection of the 2-D image onto the X and Y axes. Specifically, image 901 is shown projected onto the X axis 902, and the Y axis 903.

Analysis of the 3-D Data

Figure 10:
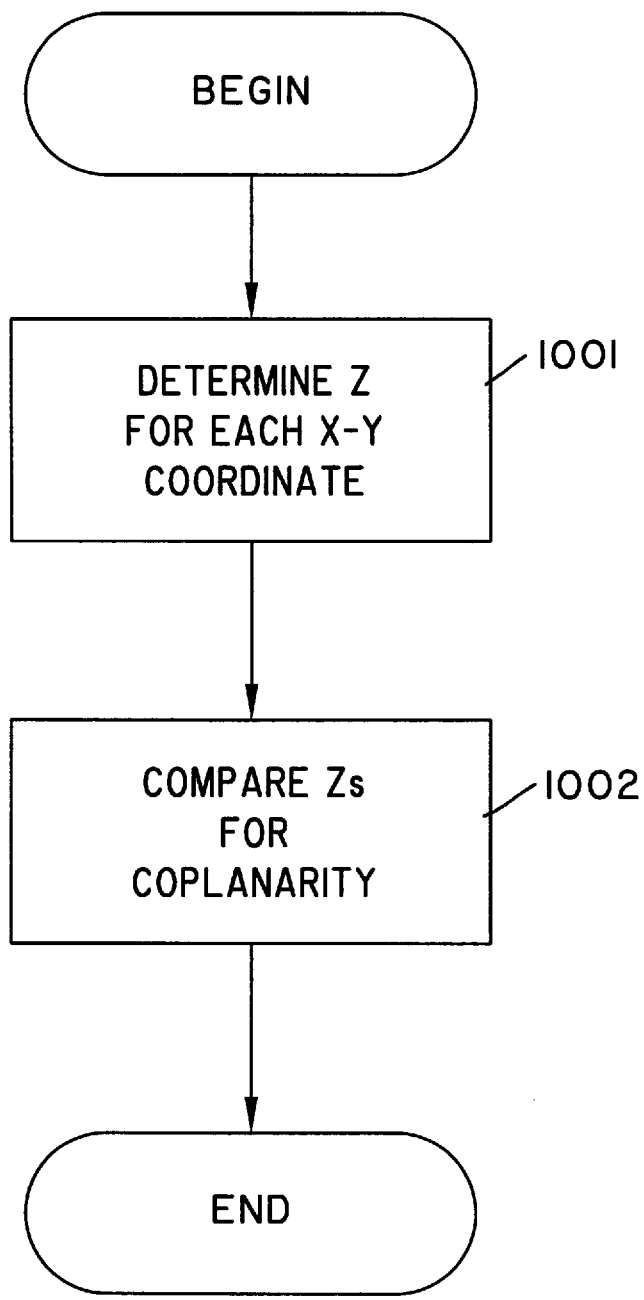
FIG. 10 is a flowchart of the analysis of the 3-D data.

In the representative embodiment of the present invention, the 3-D data is analyzed to determine i) the height of each solder ball; and ii) chip carrier coplanarity. In accordance with the flowchart of FIG. 10, the data collected from PSDs 310 and 311 is used to determine the height of each solder ball in accordance with well-known optical triangulation techniques (step 1001). As is understood by those of ordinary skill, the point where a reflected spot impinges the PSDs 310 and 311 is related to the location of the light spot on the object, which, in turn, can be used to determine image height (Z location). The respective image heights can then be compared to each other in order to determine chip carrier coplanarity (step 1002). In particular, each solder ball/bump should appear to be approximately the same height if the chip carrier is flat.

Wide Light Beam

When the light source 301 (of FIG. 3) transmits a wide beam of light, 2-D and 3-D images of a large area of the object 302 can be obtained. For example, assuming photo sensitive device 313 is a photo diode array, light retro-reflected from the object will be detected by several diodes in the array. Accordingly, information (e.g., intensity values) concerning several X-Y coordinates of the object, will be simultaneously collected by the diodes. If a feature is narrower than the laser beam, a dimension (such as, for example, a diameter) can be determined after a single pulse of the laser beam. The two PSDs 310 and 311 will then generate signals related to an average Z value of the area.

Second Exemplary Embodiment

Figure 11:
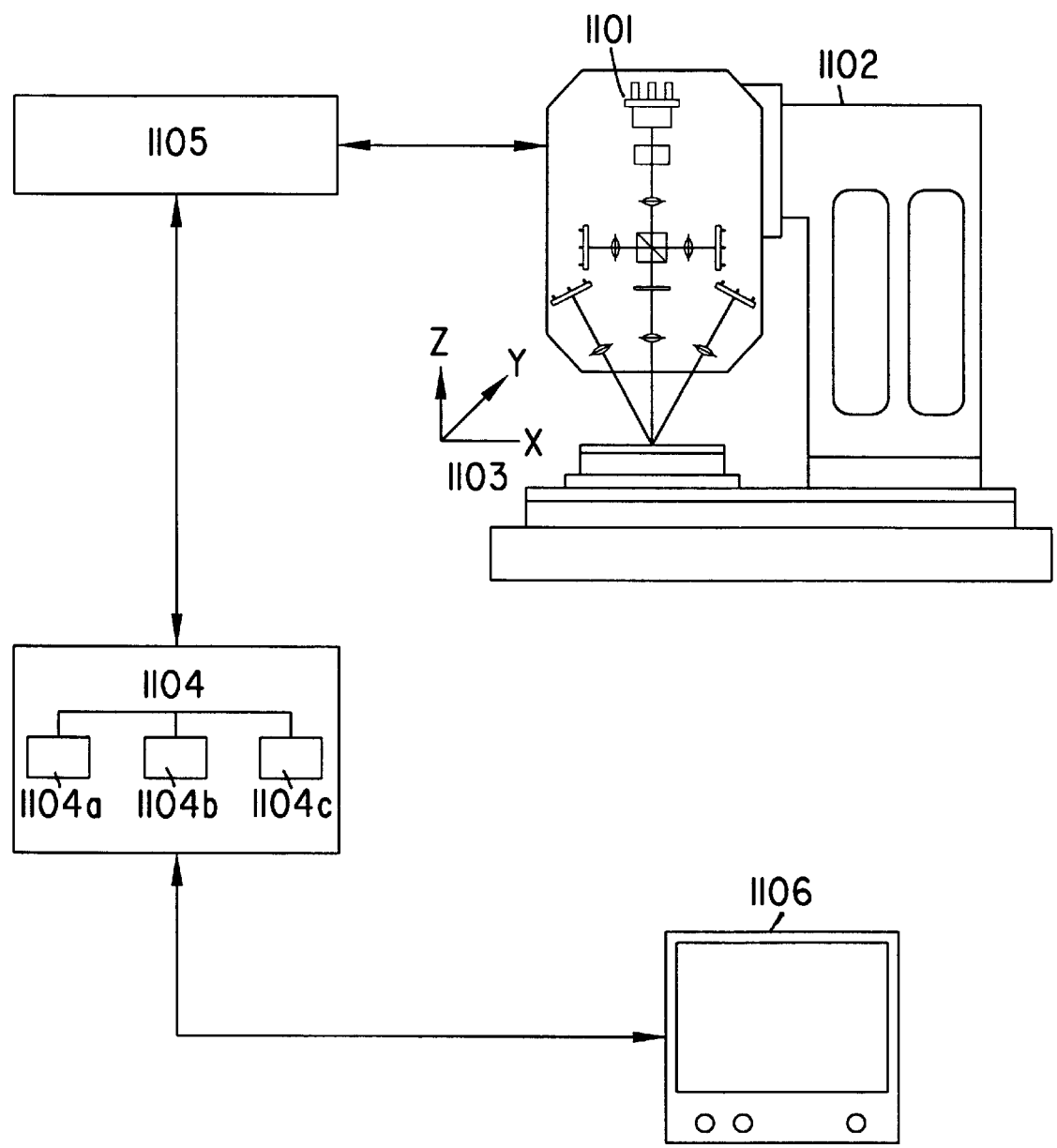
FIG. 11 is a block diagram of a second representative embodiment of the present invention.

FIG. 11 is a block diagram of a second exemplary embodiment of the present invention. As illustrated, an optical system 1101 is mounted on a gantry 1102, and positioned above an object to be measured such as a chip carrier 1103. The gantry 1102 may include, for example, a motion mechanism (not shown) such as that described in U.S. Pat. No. 5,463,227 issued to Stern et al., expressly incorporated herein by reference, for positioning the optical system 1101 to different X-Y positions above the chip carrier 1103. The motion mechanism may be controlled by a computer 1104 (which includes, for example, a microprocessor 1104a, a memory device 1104b and a program storage device 1104c) to maintain a constant speed during scanning. The position of the scanning axis is transmitted by the computer 1104 to the process electronics 1105.

Data collected by the optical system 1101 is transmitted as an analog signal to the process electronics 1105. The process electronics 1105, which includes, for example, digital signal processors (DSPs), digital to analog (D/A) converters, analog to digital (A/D) converters, and input/output (I/O) and communication links, receives and processes the analog data. The processed data is then transmitted to the computer 1104 for analysis. The results of the analysis are reported to an operator on output device 1106.

Figure 12:
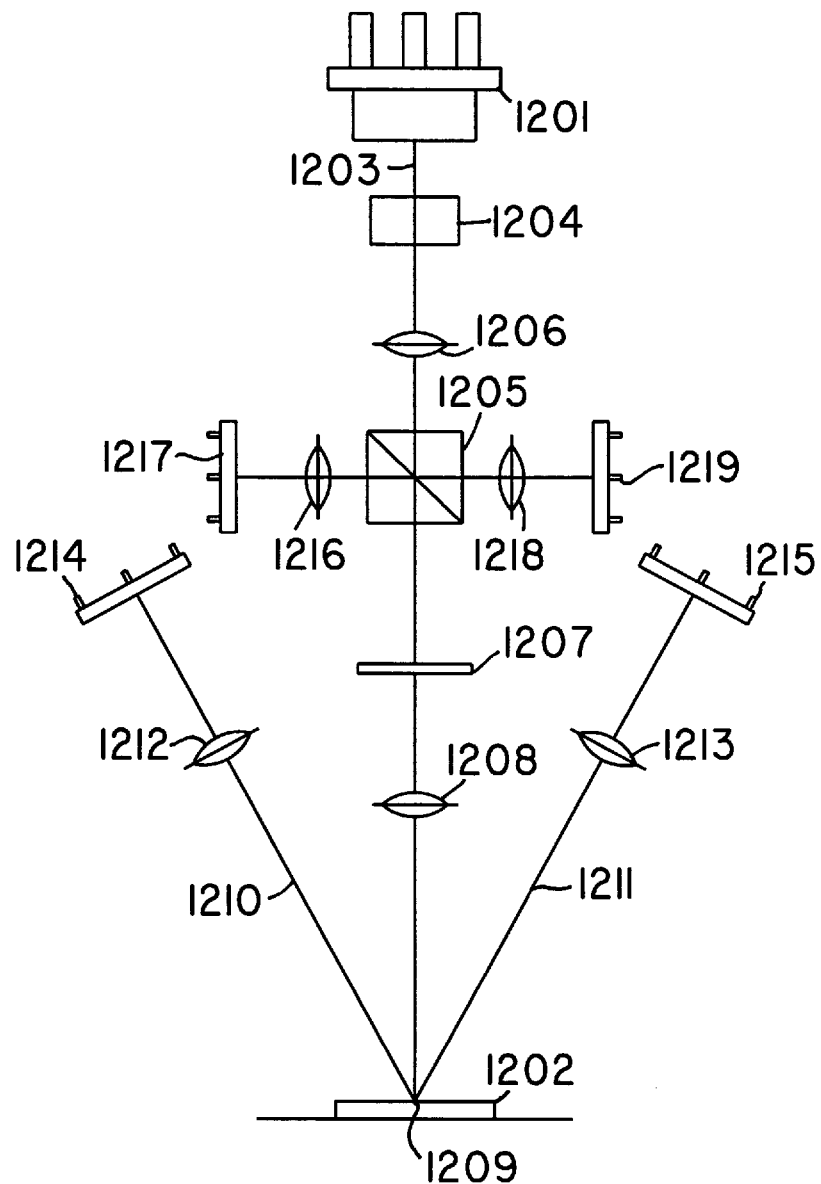
FIG. 12 is a block diagram showing further details of the optical system of FIG. 11.

FIG. 12 shows the optical portion of the system of FIG. 11 in more detail. A light source 1201 (for example, an 830 nm diode laser) controlled by process electronics 1105, is positioned by gantry 1102 to illuminate an object such as a chip carrier 1202. Light, e.g., a laser beam 1203, is directed to a deflector 1204 which selectively deflects the laser beam 1203.

The deflector 1204, controlled by process electronics 1105, includes, for example, an acousto-optic (A.O.) deflector. The laser beam 1203 can be quickly "swept" across a predetermined area of the chip carrier 1202 by continuously changing the drive frequency to the A.O. deflector and thereby continuously changing the deflection of the laser beam 1203. Accordingly, the motion mechanism of the gantry 1102, in combination with the deflector 1204, precisely determine the X-Y position (and quickly change the X-Y postion) on the object 1202 that the laser beam 1203 will impinge upon.

From the deflector 1204, the laser beam 1203 is directed to a polarizing beam splitter cube 1205 through an optical system 1206 (comprised of, for example, two plano-convex cylindrical lenses, f=60 mm, and f=22.2 mm, a lens, f=40 mm, and a half wave plate). The beam splitter 1205 reflects light that is polarized in a direction perpendicular to the surface of the page. Since the laser beam 1203 has a polarization that is primarily in the horizontal direction (in the plane of the page), most of the laser beam 1203 will pass through the beam splitter 1205. (However, a small portion of the laser beam 1203 is reflected and optionally detected for normalizing purposes by photo diode array 1219 through optical system 1218 (comprised of, for example, an achromatic lens, f=50 mm). From the beam splitter 1205, the laser beam 1203 passes through a quarter wave plate 1207 (which changes the linear polarized light to a circular polarization), and is focussed and directed through an optical system 1208 (e.g., a lens, f=25 mm) to form a focused spot 1209 at the point of impingement on the chip carrier 1202 at a known X-Y position. The laser beam 1203 impinging the object 1202 at focused spot 1209 is reflected. The light reflected off-axially with respect to the laser beam 1203 (1210, 1211) is focussed through two optical systems 1212 and 1213 (each comprised of, for example, two lenses: f=38.1 mm and 88.9 mm, and a gold mirror) on to two photo sensitive devices, such as PSDs 1214 and 1215. Analog signals generated by the PSDs 1214 and 1215 related to the detected position where the reflected light impinged the PSDs 1214 and 1215 are transmitted to the process electronics 1105.

In the second exemplary embodiment of the present invention, retro-reflected light is also detected and measured (simultaneously to collecting the 3-D data). In particular, light reflected from the focused spot 1209 back toward the light source 1201, i.e., retro-reflected light, is focussed and directed through optical system 1208 and quarter wave plate 1207 to beam splitter 1205. The quarter wave plate 1207 changes the polarization of the retro-reflected light to a linear polarization and the polarization is in a direction that is perpendicular to the surface of the page. Accordingly, beam splitter 1205 reflects the retro-reflected light through an optical system 1216 (comprised of, for example, an achromatic lens, f=50 mm) onto a photo diode array 1217. The analog signals generated by the photo diode array 1217 related to the intensity of light impinging the photo diode array 1217 and the optional normalization photo diode 1219 intensity are transmitted to the process electronics 1105.

The analog signals from the photo sensitive devices, i.e., PSDs 1214 and 1215, and photo diode arrays 1217 and 1219 are processed and analyzed by process electronics 1105 and computer 1104. In particular, the analog signals are converted to digital signals (via an A/D convertor). Z coordinates are determined from the data received from the PSDs 1214 and 1215 as described above. The data collected from photo diode array 1219 (i.e., representing the intensity of the source laser beam) is used to normalize the data collected by photo diode array 1217 (in order to maintain the accuracy of the data in the event of fluctuating laser output). The process electronics 1105 then assembles data from the photo diode arrays 1217 and 1219, the Z coordinates, and the X and Y positions into data packets and transmits the packets to the computer 1104. The computer 1104 receives the packets and performs the algorithms described in connection with FIGS. 4–10. The computer 1104 also provides an interface to a user.

As is clear from the foregoing, the present invention provides a means to determine quickly and accurately feature dimensions without the use of complex curve fitting algorithms. Furthermore, 3-D data and 2-D data are simultaneously collected. Accordingly, the object need only be scanned once to obtain all the information necessary to determine the feature dimensions.

While the present invention has been particularly shown and described with reference to preferred embodiments thereof, it will be understood by those skilled in the art that various changes in form and details may be made therein without departing from the spirit and scope of the invention.

What is claimed is:

1. A method for determining at least one dimension of at least a portion of an object, comprising the steps of:
   a) scanning at least a portion of the object with a plurality of spots of light emitted by a light source, each of the plurality of spots of light being transmitted along a respective first path, each of the plurality of spots of light impinging the object at a respective X-Y coordinate;
   b) for each respective X-Y coordinate, detecting with a position sensing detector light reflected from the object along a respective second path spaced from the respective first path, the detected light impinging the position sensing detector at a respective position;
   c) for each respective X-Y coordinate, generating a respective first signal indicating the respective position;
   d) for each respective X-Y coordinate, determining a Z-coordinate as a function of the first respective signal;
   e) for each respective X-Y coordinate, and simultaneously with step b), detecting light retro-reflected from the object at the respective X-Y coordinate;
   f) for each respective X-Y coordinate, generating a respective second signal representing an intensity of the detected retro-reflected light;
   g) forming a two-dimensional image of at least a portion of the scanned portion of the object as a function of a plurality of the respective second signals; and
   h) determining at least one dimension of the object as a function of the two-dimensional image.

2. The method of claim 1 wherein step g) includes the steps of:
   for each of the plurality of the respective second signals, comparing the respective second signal to a threshold value; and
   forming the two-dimensional image as a function of results of the comparing step; and
   wherein step h) further includes the steps of:
   projecting the two-dimensional image onto an axis; and
   determining the at least one dimension as a function of the projected two-dimensional image.

3. The method of claim 2 further comprising the steps of:
   i) obtaining a plurality of intensity values, the plurality of intensity values related to a sample object;
   j) determining a first cluster center as a function of the plurality of intensity values;
   k) determining first and second associated cluster centers, each a function of the first cluster center;
   l) associating a first subset of the plurality of intensity values with the first associated cluster center;
   m) associating a second subset of the plurality of intensity values with the second associated cluster center, wherein the second subset is different than the first subset;
   n) updating the first associated cluster center as a function of the first subset;
   o) updating the second associated cluster center as a function of the second subset;
   p) repeating steps i–o until the first associated cluster center and the second associated cluster center converge; and
   q) determining the threshold value as a function of converged first associated cluster center and second associated cluster center.

4. The method of claim 3 wherein the function of step n) is an averaging function.

5. The method of claim 1 wherein the at least one dimension is a width of a feature on the object.

6. The method of claim 1 wherein the at least one dimension is a diameter of a feature on the object.

7. The method of claim 1 further comprising the steps of:
   forming a three-dimensional image of the portion of the object as a function of a plurality of the Z-coordinates; and
   determining at least one dimension of the object as a function of the three-dimensional image.

8. A method for determining dimensions of at least a portion of an object comprising the steps of:
   a) illuminating at least a portion of an object at a predetermined X-Y coordinate with a spot of light emitted by a light source, the spot of light being transmitted along a respective first path;
   b) detecting with a position sensing detector light reflected from the object along a respective second path spaced from the respective first path, the detected light impinging the position sensing detector at a respective position;
   c) generating a respective first signal indicating the respective position;
   d) simultaneously with step b), detecting light retro-reflected from the object at the predetermined X-Y coordinate;
   e) generating a respective second signal as a function of an intensity of the light detected in step d);
   f) repeating steps a)–e) for a plurality of different portions of the object at respective X-Y coordinates;
   g) forming a three-dimensional image of at least a portion of the object as a function of a plurality of the respective first signals;
   h) forming a two-dimensional image of at least a portion of the object as a function of the respective second signals; and
   i) determining at least one dimension of the object as a function of at least one of the two-dimensional image and the three-dimensional image.

9. The method of claim 8, wherein step h) includes the steps of:
   comparing each of the plurality of respective second signals to a threshold value; and
   forming a two-dimensional image of the at least a portion of the object as a function of results of the comparing step; and
   wherein step i) includes the steps of:
   projecting the two-dimensional image onto an axis; and determining the at least one dimension as a function of the projected image.

10. The method of claim 8 wherein the at least one dimension is a diameter.

11. The method of claim 8 wherein the at least one dimension is a height.

12. A method for imaging an object comprising the steps of:

a) scanning at least a portion of the object with a plurality of spots of light emitted by a light source, each of the spots of light being transmitted along a respective first path, each of the plurality of spots of light impinging the object at a respective X-Y coordinate;

b) for each respective X-Y coordinate, detecting with a position sensing detector light reflected from the object along a respective second path spaced from the respective first path, the detected light impinging the position sensing detector at a respective position;

c) for each respective X-Y coordinate, generating a respective first signal indicating the respective position;

d) for each respective X-Y coordinate, determining a Z-coordinate as a function of the first respective signal;

e) for each respective X-Y coordinate, and simultaneously with step b), detecting light retro-reflected from the object at the X-Y respective X-Y coordinate;

f) for each respective X-Y coordinate, generating a respective second signal indicating a respective intensity of the detected retro-reflected light; and g) forming a two-dimensional image of the portion of the object as a function of a plurality of the respective second signals.

13. The method of claim 12 further comprising the step of:

forming a three-dimensional image of the portion of the object as a function of a plurality of the Z-coordinates.

14. A system for imaging at least a portion of an object comprising:

a light source for emitting a plurality of spots of light, each of the plurality of spots of light being transmitted along a respective first path to impinge the object at a respective X-Y coordinate;

a first position sensing detector for detecting for each respective X-Y coordinate light reflected from the object along a respective second path spaced from the respective first path and impinging the first position sensing detector at a respective position, the first position sensing detector also for generating for each respective X-Y coordinate a respective first signal indicating the respective position;

a photo sensitive device for detecting, simultaneously with the detection by the first position sensing detector, for each respective X-Y coordinate light retro-reflected from the object at the respective X-Y coordinate and generating for each respective X-Y coordinate a respective second signal representing an intensity of the detected retro-reflected light; and a processor for generating a three-dimensional image of the at least a portion of the object as a function of a plurality of the respective first signals, the processor also for receiving a plurality of the respective second signals and generating a two-dimensional image of the portion of the object as a function of the plurality of the respective second signals.

15. The system of claim 14 further comprising:

a beam splitter positioned along the respective first paths.

16. The system of claim 14 further comprising:

a quarter wave plate positioned along the respective first paths between the beam splitter and the object.

17. The system of claim 14 wherein the light source is a diode laser.

18. The system of claim 14 wherein the photo sensitive device is a photo diode array.

19. The system of claim 14 wherein the light source includes a deflector deflecting the emitted light along each respective first path.

20. The system of claim 14 further comprising:

a second position sensing detector for detecting for each respective X-Y coordinate light reflected along a respective third path spaced from the respective first and second paths from the object and impinging the second position sensing detector at a second respective position, the second position sensing detector for generating for each respective X-Y coordinate a respective third signal indicating the respective second position; and wherein the processor is further for receiving each respective third signal and for generating a second three-dimensional image of the portion of the object as a function of a plurality of the respective third signals.

21. The system of claim 20, further comprising:

a second photo sensitive device for detecting for each respective X-Y coordinate light emitted from the laser light source along the respective first path and for generating for each respective X-Y coordinate a respective fourth signal representing information concerning the transmitted light; and wherein the processor is further for receiving a plurality of the fourth signals and for processing the plurality of the respective second signals as a function of the plurality of the fourth signals.

22. An optical measurement system comprising:

a light source for emitting a plurality of spots of light, each of the plurality of spots of light being transmitted along a respective first path to impinge the object at a respective X-Y coordinate;

a position sensing detector for detecting for each respective X-Y coordinate light reflected from the object along a respective second path spaced from the respective first path and impinging the first position sensing detector at a respective position, the first position sensing detector also for generating for each respective X-Y coordinate a respective first signal indicating the respective position;

a photo sensitive device for detecting, simultaneously with the detection by the position sensing detector, for each X-Y coordinate light retro-reflected from the object at the respective X-Y coordinate and for generating for each respective X-Y coordinate a respective second signal representing an intensity of the detected retro-reflected light; and a processor for receiving each respective first signal and generating a three-dimensional image of at least a portion of the object as a function of a plurality of the respective first signals, the processor also for receiving each second signal and for generating a two-dimensional image of at least a portion of the object as a function of a plurality of the respective second signals, the processor further for determining at least one dimension of the object based on at least one of the two-dimensional image and the three-dimensional image.

* * * * *